United States Patent Office 3,558,271
Patented Jan. 26, 1971

3,558,271
METHOD OF PREPARING CATALYTICALLY ACTIVE $TiCl_3$
Benedetto Calcagno, 33 Via Grazioli,
Milan, Italy
No Drawing. Continuation-in-part of application Ser. No. 566,220, July 19, 1966. This application June 25, 1969, Ser. No. 836,645
Int. Cl. C10g 23/02
U.S. Cl. 23—87        8 Claims

ABSTRACT OF THE DISCLOSURE

A process for preparing catalytic titanium trichloride by reducing titanium tetrachloride by means of an organo-metallic compound of aluminum or magnesium in an aliphatic or alkyl-aryl ether. The reaction mixture is generally aged at a temperature from 20° to 200° C. for a time period of from 0.2 to 3.0 hours, and the resulting solid titanium trichloride product is recovered and washed in anhydrous organic solvent.

CROSS-REFERENCE TO RELATED APPLICATION

The present application is a continuation-in-part of Ser. No. 566,220 filed July 19, 1966 now abandoned.

BACKGROUND OF THE INVENTION (1) Field of the invention

The present invention relates to a method of preparing titanium trichloride by a reduction of titanium tetrachloride by means of an organo-metallic compound of aluminum or magnesium in an aliphatic or alkyl-aryl ether.

(2) Description of the prior art

It is well known that titanium trichloride has acquired a considerable importance during recent years as a component of stereospecific catalysts for the polymerization of alpha-olefins, more particularly propylene.

It is moreover known that titanium trichloride exists in various crystalline forms which behave sharply differently when employed for polymerizing alpha-olefins; more particularly the brown form (also referred to as beta form) leads in the polymerization of propylene to low stereospecificities (40 to 60%) and reaction speeds quickly decreasing with time, while the violet forms (alpha, gamma, delta) exhibit constant activities and very high stereo-specificities.

It is further known that the violet $TiCl_3$ of alpha form is prepared from $TiCl_4$ by reduction with hydrogen at high temperature, that the brown form (beta) can be prepared either by the action of corona discharges on $TiCl_4$ or by photochemical decomposition at room temperature of titanium trichloromonalkyls obtained by reaction of $TiCl_4$ and aluminum alkyls at low temperatures.

The gamma or delta violet forms are obtained either by heating to 150°–200° C. the brown form or by direct reduction of the titanium tetrachloride with aluminum or aluminum alkyls at a temperature between 150° and 200° C.

The manner of obtaining the said forms of titanium trichloride always considerably affects the characteristics of the catalysts obtainable therefrom, more particularly their stereospecificity.

SUMMARY OF THE INVENTION

We have now developed a method of preparing $TiCl_3$ of violet form which yields on polymerization of propylene stereospecific polymers exhibiting an extremely high percentage of isotactic form non-extractable in boiling n-heptane.

The method essentially relies upon the idea of effecting reduction of titanium tetrachloride by means of an organo-metallic compound of aluminum or magnesium in an aliphatic or alkyl-aryl ether.

DETAILED DESCRIPTION OF THE INVENTION

In this connection, a solution of $TiCl_4$ in a selected ether and, separately, a solution of the organo-metallic compound in the same ether are conveniently prepared.

The two solutions are subsequently mixed by proportions such that the ratio of the $TiCl_4$ moles to the number of organo-metallic linkages is from 0.95 to 1, at a temperature from room temperature (20° C.) up to 200° C.

The resulting mixture is subsequently "aged" at a temperature between 160° and 200° C., preferably 180° to 190° C. during a period of time ranging from 0.2 to 3 hours, preferably 0.5 and 1 hour.

Pressure is of no particular importance. It will be sufficient to operate at the autogenous pressure of the system at the temperatures selected for the reaction.

On completion of the reaction the product is cooled, filtered, washed at first with anhydrous ether, subsequently with anhydrous hydrocarbon, preferably an aromatic hydrocarbon, such as benzene or toluene, finally dried.

The result is a titanium trichloride in a highly active form which, if employed as catalyst in polymerization of propylene in mixture with aluminum triethyl, yields polymers having a residue insoluble in heptane from 92 to 96%.

It is essential to point out that by effecting reduction of $TiCl_4$ with organo-metallic compounds of aluminum in an aliphatic or aromatic hydrocarbon solvent with the use of a technique similar to the one described, we constantly obtained a titanium trichloride with satisfactory polymerizing activity, which, however, yielded polymers with a residue insoluble in heptane of 88% as a maximum. Reduction tests carried out in other solvents always led to less satisfactory results and set out the peculiar action aliphatic or alkyl-aryl ethers as liquid media suitable for carrying out the said reaction.

As mentioned above, all the aliphatic or alkyl-aryl ethers employed by us yielded satisfactory results; however, ethyl ether, butyl ether and isoamyl ether are preferred among aliphatic ethers, anisol and phenylisopropyl ether are preferred among the aromatic ethers.

Propylene polymerization tests for comparison of the various types of titanium trichloride obtained were carried out in identical apparatus and under similar conditions, the propylene quantity absorbed by unit of time being measured.

The extraction of polymers with boiling n-heptane was carried out on all test specimens by introducing a weighed quantity (about 6 g.) polymer into the thimbles of a Kumagava extractor and maintaining the solvent (about 300 ml. n-heptane Esso) at vigorous boiling during 25 hours. On completion of extraction the thimble was vacuum dried at 70° C. till constant weight.

The present invention is further illustrated by the following examples, which are not intended to be limiting in nature.

Example 1

A solution of 20 g. $TiCl_4$ in 500 ml. anhydrous toluene is charged in a dry nitrogen atmosphere to a 2 liters stainless steel autoclave (perfectly dry) provided with a magnetic stirrer. The solution is stirred and 4.0 g. aluminum triethyl dissolved in 500 ml. toluene are introduced at room temperature during 15 minutes. The autoclave is subsequently heated in half an hour to 180° C. (pressure 5.3 atm.) and maintained during 15 minutes at this temperature.

The reaction mass is cooled, filtered through a porous strainer G1, thoroughly washed with anhydrous toluene and finally vacuum dried at 50° C. during 2 hours. All of the operations are obviously performed in a nitrogen atmosphere with the exclusion of air and moisture. The result is 12.8 g. violet titanium trichloride, which shows on analysis also a content of small quantities (3–4%) bivalent titanium.

Example 2

20 g. titanium tetrachloride dissolved in 500 ml. n-paraffins (mixtures of decane, undecane and dodecane, with boiling point 185° C.) are introduced in a dry nitrogen medium into a four-necked, 2-liters Pyrex flask equipped with thermometer, stirrer, reflux condenser and dropping funnel. The solution is heated to 150° C. and a solution of aluminum monochlorodiethyl in 500 ml. paraffins is added drop by drop from the funnel while vigorously stirring.

On completion of the addition the mass is refluxed during 30 minutes, then cooled and filtered; the titanium trichloride is washed with anhydrous n-heptane and dried under similar conditions as described in the preceding example. 13.1 g. violet trichloride titanium are obtained.

Example 3

The test of Example 1 is repeated using anhydrous ethyl ether instead of toluene. The autoclave is heated up to a pressure of 25 atm. and a temperature of about 170° C.

On completion of the test the titanium trichloride is filtered, washed first with ethyl ether, subsequently with petroleum ether, finally dried under the same conditions as described in Example 1. 13.65 g. violet titanium trichloride are obtained.

Example 4

The test of Example 2 is repeated, using isoamyl ether instead of n-paraffins and 13.5 g. sesquichloride of aluminum-ethyl instead of aluminum diethyl monochloride. The test is carried out at a temperature of 170° C. during 30 minutes.

On completion of the test the precipitate is filtered, washed at first with isoamyl ether, then with petroleum ether, finally dried under the same conditions as described in Example 1. 12.7 g. violet titanium trichloride are obtained.

Example 5

A set of propylene polymerization tests were carried out on the four samples of $TiCl_3$ prepared according to Examples 1, 2, 3, and 4 and on a fifth sample obtained by reduction with hydrogen, under the following conditions:

Apparatus: 2 liters, 4-necked glass flask equipped with a stirrer, thermometer, feed tube for gas and pressure gauge.
Solvent: 1 liter n-heptane.
Catalyst: $TiCl_3$ and $AlEt_2Cl$ by a molar ratio 1:3 equivalent to 0.5 g. $TiCl_3$ and 1.9 g. $AlEt_2Cl$.
Temperature: 70° C.
Pressure: superatmospheric 60 mm. Hg.
Period of test: two hours.

Table 1 summarizes by way of comparison the activities (measured in grams polymer per gram $TiCl^3$) and residues insoluble in heptane obtained from the various $TiCl_3$ samples.

TABLE 1

| Type of $TiCl_3$ | Activity | Percent polymer insoluble in heptane |
|---|---|---|
| $TiCl_3$ reduced by $H_2$ | 22 | 81.3 |
| Example: | | |
| 1 | 73 | 84 |
| 2 | 68 | 87.2 |
| 3 | 125 | 94.7 |
| 4 | 114 | 92.3 |

The method of the present invention by which the titanium tetrachloride is reduced to titanium trichloride proceeds in the presence of a complex compound, as distinct from a mixture of an ether with an organometallic compound. This can be seen by referring to Example 3 above. In Example 3, the mere contact of the ethyl ether and the triethyl aluminum leads to a complex compound $(C_2H_5)_3Al \cdot (C_2H_5)O$, which has a definite boiling point of from 216° C. to 219° C., which is not comparable with the boiling points of various reactants. This complex compound may be termed an oxonium compound.

What is claimed is:

1. A method of preparing a catalytically effective highly active violet titanium trichloride useful as a catalyst in conjunction with a dialkylaluminum monochloride in the polymerization of propylene, and which is stereospecific to the production of isotactic polypropylene which is nonextractable in boiling n-heptane in a quantity of at least 94% by weight with respect to the weight of the resulting polymerizate when said polymerization of propylene is carried out by using said violet titanium trichloride as a catalyst in conjunction with aluminum diethylmonochloride in a 3:1 molar ratio, said method comprising:

(a) dissolving titanium tetrachloride in a molar excess of anhydrous ethyl ether to form a first solution,
(b) dissolving triethyl aluminum in a molar excess of anhydrous ethyl ether to form a second solution,
(c) introducing at a temperature of from 20 to 200° C. a sufficient amount of said second solution into said first solution with stirring such that the ratio of moles of titanium tetrachloride to the number of organometallic links is within the range of from 0.95:1 to 1:1,
(d) maintaining the resulting mixture at a temperature of from 160 to 200° C. for a period of time of from 0.2 to 3.0 hours, and
(e) cooling said mixture and recovering said violet titanium trichloride by filtering, washing with anhydrous ethyl ether and anhydrous aromatic hydrocarbon solvent and drying, each of the above steps (a) through (e) being carried out in the absence of air and moisture.

2. A method of preparing catalytically effective titanium trichloride as in claim 1, wherein the temperature of said resulting mixture is maintained within the range of from 180 to 190° C.

3. A method of preparing a catalytically effective titanium trichloride as in claim 1, wherein the period of time during which said resulting mixture is maintained at a temperature of from 160 to 200° C. varies from 0.5 to 1 hour.

4. A method of preparing a catalytically effective titanium trichloride as in claim 1, wherein said anhydrous aromatic hydrocarbon solvent is selected from the group consisting of benzene and toluene.

5. A method of preparing a catalytically effective titanium trichloride as in claim 2, wherein the period of time said resulting mixture is maintained at a temperature of between 180 and 190° C. varies from 0.5 to 1 hour.

6. A method of preparing a catalytically effective titanium trichloride as in claim 2, wherein said aromatic anhydrous hydrocarbon solvent is selected from the group consisting of benzene and toluene.

7. A method of preparing a catalytically effective titanium trichloride as in claim 3, wherein said anhydrous aromatic hydrocarbon solvent is selected from the group consisting of benzene and toluene.

8. A method of preparing a catalytically effective highly active violet titanium trichloride useful as a catalyst in conjunction with a dialkylaluminum monochloride in the polymerization of propylene, and which is stereospecific to the production of isotatic polypropylene which is nonextractable in boiling n-heptane in a quantity of at least 94% by weight with respect to the weight of the resulting polymerizate when said polymerization of propylene is carried out by using said violet titanium trichloride as a catalyst in conjunction with aluminum diethylmonochloride in a 3:1 molar ratio, said titanium trichloride having an activity of at least 125 grams of polymer produced per gram of titanium trichloride used as catalyst, said method comprising:

(a) dissolving titanium tetrachloride into anhydrous ethyl ether in a ratio of about 20 grams of said titanium tetrachloride per 500 ml. of said anhydrous ethyl ether to form a first solution, (b) dissolving triethyl aluminum in anhydrous ethyl ether in a ratio of about 4.0 grams of said triethyl aluminum per 500 ml. of said anhydrous ethyl ether to form a second solution, (c) introducing, at room temperature, said second solution into said first solution with stirring over a period of time of about 15 minutes per each 500 ml. of said second solution, (d) heating the resulting mixture to a temperature of about 170° C. and to a pressure of about 25 atmospheres, and maintaining said temperature for about 15 minutes, and (e) cooling said resulting mixture and recovering said violet titanium trichloride by filtering, washing first with anhydrous ethyl ether and then with anhydrous petroleum ether and finally vacuum drying at a temperature of about 50° C. and for a period of time of about 2 hours, each of the above steps (a) through (e) being carried out in the absence of air and moisture.

References Cited
UNITED STATES PATENTS

| | | | |
|---|---|---|---|
| 3,109,822 | 11/1963 | Kaufman et al. | 252—429 |
| 3,146,224 | 8/1964 | Coover, Jr., et al. | 260—93.7 |
| 3,280,093 | 10/1966 | Coover, Jr., et al. | 260—93.7 |
| 3,345,351 | 10/1967 | McCall et al. | 23—87X |

OTHER REFERENCES

Hackh's Chemical Dictionary, third edition, revised (1944), p. 607. McGraw-Hill Book Co., Inc., New York, N.Y.

PATRICK P. GARVIN, Primary Examiner

U.S. Cl. X.R.

252—429

UNITED STATES PATENT OFFICE
CERTIFICATE OF CORRECTION

Patent No. 3,558,271                    Dated   January 26, 1971

Inventor(s)   Benedetto Calcagno

It is certified that error appears in the above-identified patent and that said Letters Patent are hereby corrected as shown below:

In the heading to the printed specification, after li 8, insert -- Claims priority, application Italy, July 23, 196 16700/65 --.

Signed and sealed this 7th day of September 1971.

(SEAL)
Attest:

EDWARD M. FLETCHER, JR.                ROBERT GOTTSCHALK
Attesting Officer                       Acting Commissioner of Pate